United States Patent [19]

Battson et al.

[11] Patent Number: 4,481,538
[45] Date of Patent: Nov. 6, 1984

[54] OVERCOMING FLICKER IN FIELD-INTERLACED CCD IMAGERS WITH THREE-PHASE CLOCKING OF THE IMAGE REGISTER

[75] Inventors: Donald F. Battson, Landisville; Eugene D. Savoye, Lancaster, both of Pa.

[73] Assignee: RCA Corporation, New York, N.Y.

[21] Appl. No.: 428,589

[22] Filed: Sep. 30, 1982

[51] Int. Cl.³ .............................................. H01I 11/14
[52] U.S. Cl. ................................... 358/213; 358/241; 358/212; 357/24
[58] Field of Search ................. 250/334, 330; 358/213, 358/241, 209, 214, 212; 357/24 LR; 307/607, 444; 377/57

[56] References Cited

U.S. PATENT DOCUMENTS 3,801,884  4/1974  Sequin ............................ 317/235 R
4,231,149 11/1980  Chapman et al. ............. 357/24 LR
4,236,168 11/1980  Herbst ........................... 357/24 LR
4,394,675  7/1983  Anagnostopoulos et al. .. 357/24 LR

OTHER PUBLICATIONS

"Interlacing in Charge Coupled Imaging Devices", Carlo H. Sequin, IEEE Transactions on Electron Devices, vol. ED-20, No. 6, Jun. 1973, pp. 535–541.

Primary Examiner—Gene Z. Rubinson
Assistant Examiner—Robert Lev
Attorney, Agent, or Firm—Joseph S. Tripoli; George E. Haas; Allen LeRoy Limberg

[57] ABSTRACT

Field-rate flicker is suppressed in a CCD imager having a three-phase operated image register provided interlacing by integrating odd-numbered fields with only the first clock phase high and even-numbered fields with only the second and third clock phases high. The flicker is suppressed by making the gate electrodes in the A register receiving the second and third clock phases of equal lengths, half that of the gate electrodes receiving the first clock phase.

8 Claims, 5 Drawing Figures

OVERCOMING FLICKER IN FIELD-INTERLACED CCD IMAGERS WITH THREE-PHASE CLOCKING OF THE IMAGE REGISTER

The present invention relates to overcoming a field-rate flicker problem in field-interlaced CCD imagers of the field transfer type and, more particularly, of the sort employing three-phase clocking of their image (or A) register.

C. H. Sequin in U.S. Pat. No. 3,801,884 issued Apr. 2, 1974 and entitled "Charge Transfer Imaging Devices" describes, in connection with his FIG. 5, a system for providing field interlace in such CCD imagers. In this system the image (or A) register and the field storage (or B) register cascaded thereafter are supplied conventional three-phase CCD clocking signals during the field transfer intervals that take place in the field retrace times of the video output signal of the imager. Each of these field transfer intervals is between successive image integration times, during field trace times of the imager video output signal. The length $L_{A1}$ of the A-register gate electrodes receiving the first clocking pulse $\phi_{A1}$, the length $L_{A2}$ of the A-register gate electrodes receiving the second clocking pulse $\phi_{A2}$, and the length $L_{A3}$ of the A-register gate electrodes receiving the third clocking phase are all equal in the CCD imager shown in FIG. 5 of the Sequin patent.

During the image integration times of odd-numbered fields—i.e., during even field trace—the three-phase clocking of the image register is halted, so that depletion regions are induced proximate to the gate electrodes receiving a first clock phase $\phi_{A1}$. Charge carriers generated by photoconversion are collected in these depletion regions to generate the charge packets sampling the image, to be transferred to the field storage (or B) register during the forthcoming field trace interval and then to be clocked out line-by-line during the next field trace interval through a read-out (or C) register.

During the image integration times of even-numbered fields, the three-phase clocking is halted, so that depletion regions are induced proximate to the gate electrodes receiving second clock phase $\phi_{A2}$ and those receiving third clock phase $\phi_{A3}$; and charge carriers generated by photoconversion of the image are collected in those depletion regions. The resulting charge packets sampling the image are transferred to the field store register during the following field retrace and are clocked out from the field store register line-by-line through the read-out register, which performs a parallel-to-series-data conversion, in the following field trace interval.

A CCD imager of the type shown in FIG. 5 of the Sequin patent undesirably exhibits a field-rate flicker. A way to provide for three phase operation of the A and B registers of a CCD imager, which does not exhibit field-rate flicker, has been described by Sequin in his comprehensive article "Interlacing in Charge Coupled Imaging Devices," *IEEE Transactions on Electron Devices*, Vol. ED-20, No. 6, June 1973, pp. 535–541. Integration is under only the first phase electrodes in odd-numbered-field integration times and under only the second or third phase electrodes in even-numbered-field integration times. The areas of the gate electrodes under which image integration takes place during alternate fields is similar in successive fields. Since the depletion regions induced under these electrodes for collecting charge are of like size in successive fields, similar amounts of dark current are accumulated in each field, substantially eliminating one source of field-rate flicker. The coupling of B and C register clocking signals to the A register during image integration times, which coupling is via capacitances of the registers to their common substrate, is more alike in successive fields, substantially eliminating another source of field-rate flicker. However, while this approach provides three-phase operation that is relatively flicker-free, the field interlacing is imperfect and leads to aliasing on diagonal lines that is unacceptable in critical applications such as television broadcast cameras.

So far as is known, the problem of providing a three-phase operated CCD imager of the field transfer type which exhibits both good field interlace and freedom from objectionable field-rate flicker has not yet been solved. This is believed to be because the mechanisms for providing essentially perfect field interlace in the CCD imager shown in FIG. 5 of the Sequin patent have not been well enough understood, even by those highly skilled in the CCD imager design, to allow design of such an imager. Contrary to apparent expectation, the present inventors have found that these mechanisms can be used to achieve essentially perfect field interlace despite there being a similarity in the areas of the gate electrodes under which charge integration takes place in successive fields, so that field-rate flicker is suppressed. The following analysis shows why this is so.

During the alternate image integration times when integrating potential is applied only to the gate electrodes receiving $\phi_{A1}$ clock phase, charge carriers generated in the depletion regions under these electrodes will be retained in those regions until being clocked out in $\phi_{A1}$ phase during field transfer. Charge carriers generated between these depletion regions will, on statistical average, migrate to the depletion regions closest to their respective generation sites. That is, charge carriers in substantially the same number as generated at sites within $(\frac{1}{2})L_{A1}$ plus $\frac{1}{2}(L_{A2}+L_{A3})$—i.e., within $\frac{1}{2}(L_{A1}+L_{A2}+L_{A3})$—of the center of each $\phi_{A1}$ gate electrode will be collected under it during these integration times. So pixel centers in each line of pixels will during these integration times be at mid-length of a gate electrode receiving $\phi_{A1}$ clocking during field transfer. Note that the process of centering the alternate-field pixels at mid-length of the $\phi_{A1}$ gate electrodes is independent of the ratio of the lengths $L_{A1}$, $L_{A2}$ and $L_{A3}$; these lengths need not be 1:1:1 ratio as shown by Sequin.

During the intervening image integration times when integrating potentials are applied to the gate electrodes receiving $\phi_{A2}$ and $\phi_{A3}$ clock phases, charge carriers generated under the $\phi_{A1}$ gate electrodes at barrier potential will, on statistical average, migrate half towards the preceding $\phi_{A3}$ gate electrode and half towards the succeeding $\phi_{A2}$ gate electrodes, assuming the $\phi_{A3}$ and $\phi_{A2}$ gate electrodes receive the same value of integrating potentials. That is, the pixel edges are at mid-lengths of $\phi_{A1}$ gate electrodes, irrespective of the ratio $L_{A1}:L_{A2}:L_{A3}$. When clocking is resumed, the charges under each pair of adjacent $\phi_{A2}$ and $\phi_{A3}$ gate electrodes are merged. Therefore, the apportionment of a charge under them as a function of their respective lengths $L_{A2}$ and $L_{A3}$ is no longer of any consequence insofar as field interlacing is concerned. From this analysis it should now be clear that, surprisingly, field interlace is essentially perfect without regard to the relative values of $L_{A1}$, $L_{A2}$ and $L_{A3}$.

As noted before, field flicker is reduced when the area of the gate electrodes under which charge accumulation takes place in even numbered fields is the same as the area of the plate electrodes under which charge accumulation takes places in odd-numbered fields. Where only $\phi_{A1}$ gate electrodes receive integrating potential in one of these sets of fields and only the $\phi_{A2}$ and $\phi_{A3}$ gate electrodes receive integrating potential in the other set of fields, the following condition must be met to best suppress field flicker, assuming constant width channels in the A register.

$$L_{A1} = L_{A2} + L_{A3}$$

There is, however, a further practical constraint on the ratio $L_{A1}:L_{A2}:L_{A3}$, imposed when one wishes to avoid blooming effects until as high image brightness level as possible. The capacities to hold charge in the potential wells associated with the depletion regions induced under the $\phi_{A2}$ and $\phi_{A3}$ gate electrodes should be equal, so one set of regions is not driven into blooming at lower image brightness level than the other. Where $\phi_{A2}$ and $\phi_{A3}$ clock voltages are similar in amplitude, this is achieved by making $L_{A1}$ and $L_{A2}$ equal. Since $L_{A1} = L_{A2} + L_{A3}$ the effects of blooming have their onset at similar brightness levels in both odd and even fields, so there is no field-rate flicker introduced by excess charge spilling into the anti-blooming drains.

The present invention is embodied in a CCD imager of field transfer type with an A register in which the gate electrode lengths are so proportioned essentially to meet the $L_{A1} = L_{A2} + L_{A3}$ condition necessary for best field interlace, when three-phase clocking is to be used in the A register. Preferably, the length $L_{A1}$ of the $\phi_{A1}$ gate electrodes under which image integration takes place during alternate image integration times is made twice the length of each of the equal-length $\phi_{A2}$ and $\phi_{A3}$ gate electrodes under which image integration takes place during the intervening image integration times.

Figure 1:
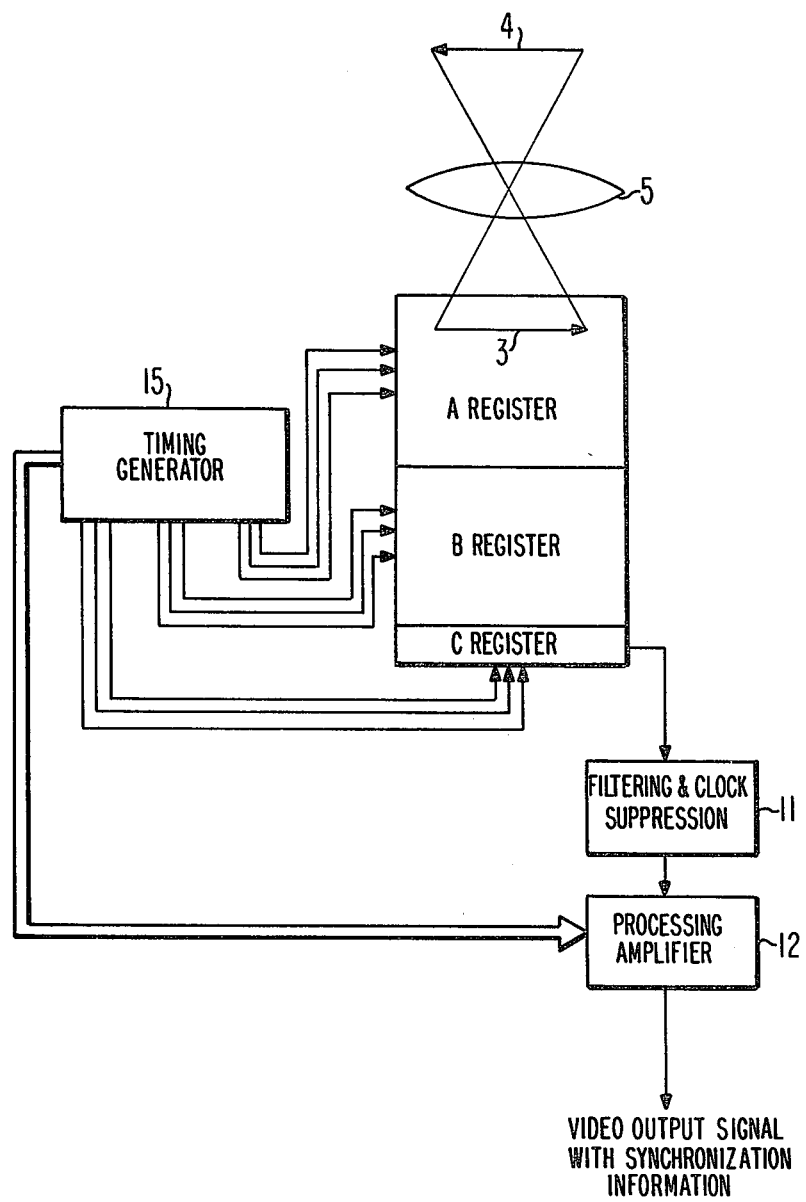
FIG. 1 is a schematic diagram, in block form, of the CCD imager camera in which the present invention is embodied.
Figure 4:
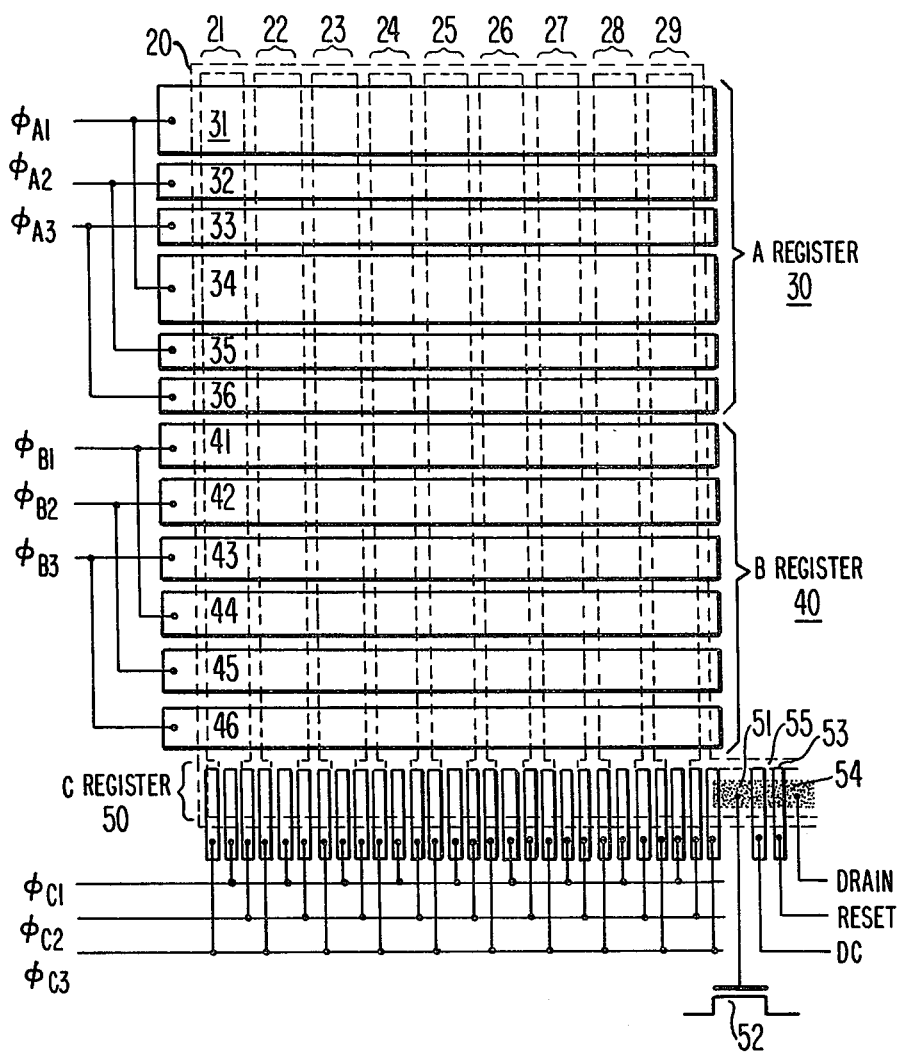
Figure 5:
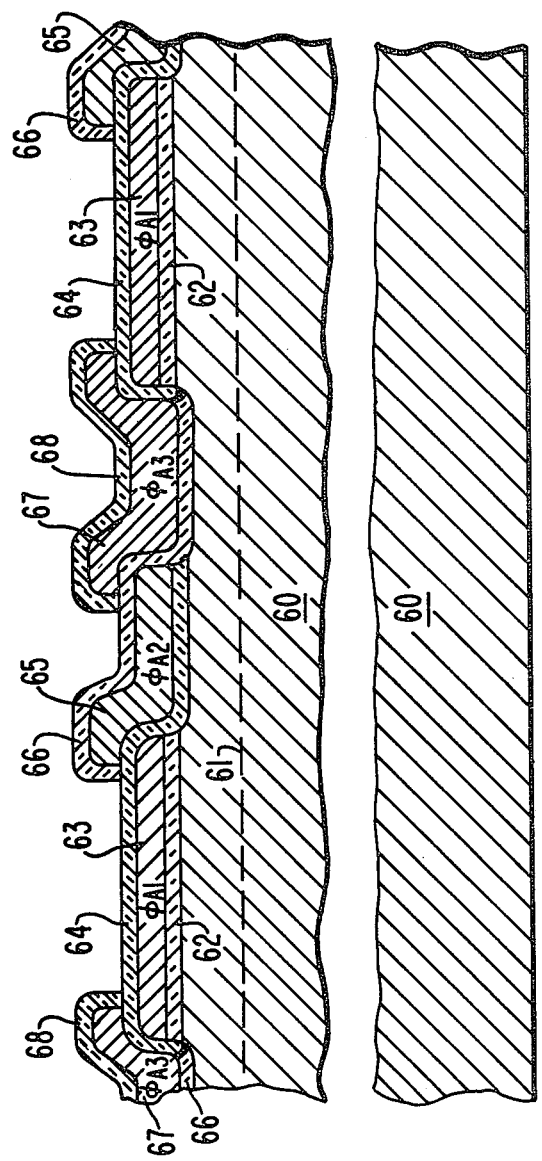

FIG. 4 is a simplified plan view of the FIG. 1 CCD imager construction with first-phase gate electrodes in its image register being of a length equal to the combined lengths of the second-phase and third-phase gate electrodes, in accordance with the present invention; and FIG. 5 is a cross-section of the triple-polysilicon structure of a group of A register gate electrodes with lengths proportioned in accordance with the invention.

In FIG. 1 an image 3 of an object 4 is focussed by a lens assembly 5 (symbolized by a simple converging lens) in the image, or A, register of a field transfer type of CCD image 10. CCD imager 10 differs from prior-art CCD imagers of its type in that the first-phase gate electrodes of its A register are of a length equal to the combined lengths of the second-phase and third-phase gate electrodes in its A register. CCD imager 10 has in addition to its A register a field store, or B, register masked against radiation; a read-out, or C, register masked against radiation and providing parallel-to-serial data conversion; and a stage at the end of its C register for converting consecutive charge samples to video signal output samples. The video output signals from this stage are per conventional practice forwarded to circuitry 11 for filtering and clocking signal supression, the resulting signal being supplied to a processing amplifier 12 for insertion of conventional synchronizing signals to provide a video output signal with synchronization information.

A timing generator 15 proceeds from an internal or external master clock (not shown) to generate three-phase clocking signals for the A register of CCD imager 10 during field transfer times, suitable clocking signals for the B and C registers of CCD imager 10, and the synchronization information processing amplifier 12 puts into video output signal. These signals are substantially the same as those used in implementing the FIG. 5 configuration of U.S. Pat. No. 3,801,884.

Figure 2:
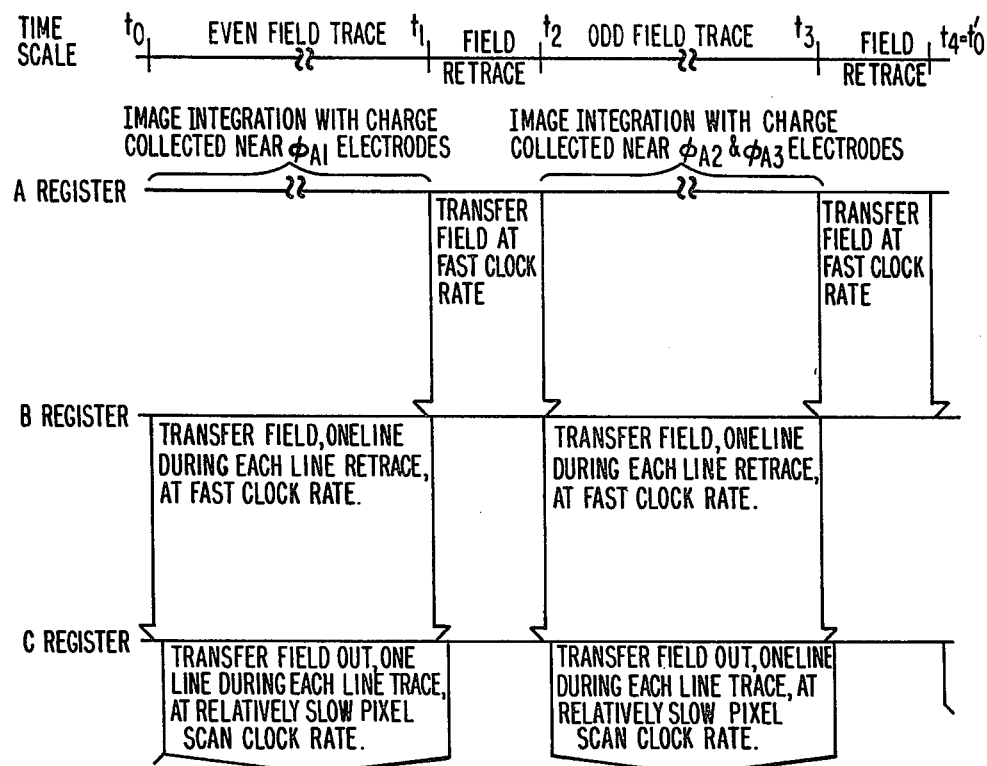
FIG. 2 is a general timing diagram descriptive of charge transfer in the CCD imager of FIG. 1.
Figure 3:
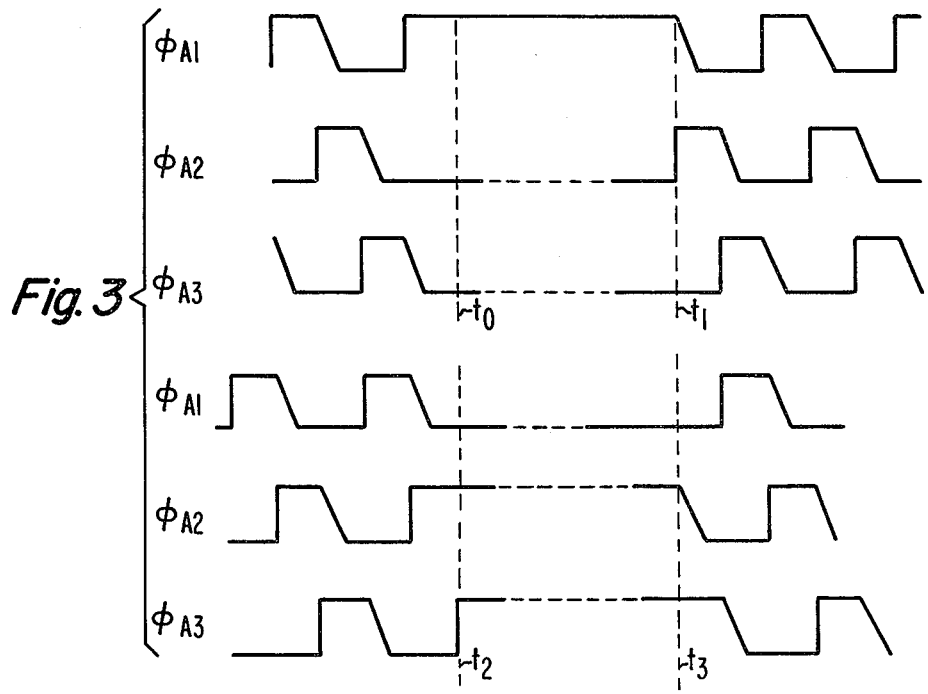
FIG. 3 is a detail of the general timing diagram of FIG. 2 showing how image register clocking is halted when integrating an odd-numbered field image and when integrating an even-numbered field image.

FIG. 2 is a timing diagram of successive fields of CCD imager 10 operation responsive to clocking signals from timing generator 15, and FIG. 3 shows the details of the differences in how the three-phase clock for the A register of CCD imager 10 is halted during image integration for odd-numbered and even-numbered fields. FIG. 3 is arranged to show at top the three phases $\phi_{A1}$, $\phi_{A2}$, $\phi_{A3}$ of A-register clocking during the image integration interval (from time $t_0$ to time $t_1$), of an odd-numbered field, and to show at bottom the three-phases of A-register clocking during the image integration interval (from time $t_2$ to time $t_3$) of an even-numbered field.

The even-numbered field trace interval, from time $t_0$ to time $t_1$, is the image integration interval for the odd-numbered field which is to follow. A-register clocking is halted as can be seen in FIG. 2. B-register clocking takes place during line retrace intervals to advance a new line of pixel samples into the C register, after the previous line of pixel samples has been clocked out of the C register at pixel scan clock rate during the preceding line trace interval. B-register clocking may be three-phase clocking like normal A-register clocking or, as known, may be otherwise—e.g. two-or four-phase clocking. As shown in FIG. 3, A-register clocking is halted so only phase $\phi_{A1}$, is high, the high condition being associated with the gate electrodes of the A register receiving a potential such as to induce charge depletion regions in the semiconductive material next to them. So charge integration takes place next to the gate electrodes receiving the first phase $\phi_{A1}$ of A-register clocking during the interval between times $t_0$ and $t_1$, when the charge carriers generated by photoconversion of radiant energy image 3 are collected in the depletion regions induced next to the $\phi_{A1}$ gate electrodes of the A register. Charge generated in each of the regions between the gate electrodes receiving $\phi_{A1}$ A-register clocking will tend to migrate to the closer of the two flanking $\phi_{A1}$ gate electrodes, so pixel edges will be midway between the center lines of the $\phi_{A1}$ electrodes.

A-register clocking resumes during the odd-numbered field transfer interval from time $t_1$ to $t_2$. The A and B registers are clocked at fast rate to transfer the integrated charge packets descriptive of image pixels from the A register where they originated to the B register for storage. Conventionally the C register is clocked at high rate to drain remnant dark currents accumulated in the B register during the previous field trace interval. At the end of this field transfer interval the charge samples describing pixels in the odd-numbered field are stored in the B register of imager 10.

During the ensuing odd-number field trace interval from time $t_3$ to time $t_4$, this stored field is transferred a line at a time during line retrace interval from the B register to the C register. During the line trace intervals the charge packets sampling the odd-numbered field trace are clocked out of the C register at pixel scan rate and converted to video output voltage or current. A-register clocking is halted during the odd-numbered field trace so that the charge samples descriptive of the ensuing even-numbered field can be accumulated by the photoconversion of radiant energy image 3.

A-register clocking is halted such that the gate electrodes receiving the second and third clocking phases $\phi_{A2}$ and $\phi_{A3}$ are high, inducing charge depletion regions in the semiconductor substrate near these electrodes. Charge integration takes place in these regions. Charge generated in the regions under each of the gate electrodes receiving $\phi_{A1}$ A-register clocking will tend to migrate to the closer of the preceding and succeeding gate electrodes, so pixel edges will be at the center lines of the $\phi_{A1}$ gate electrodes. The relative lengths of the gate electrodes receiving different phases of A-register clocking is of no consequence in this regard. (It is assumed that all the gate electrodes in the A register receiving the same one of any of the clocking phases $\phi_{A1}$, $\phi_{A2}$, and $\phi_{A3}$ are of similar lengths.)

In odd-numbered fields pixel edges are midway between the center lines of the $\phi_{A1}$ electrodes, and in even-numbered fields pixel edges are at the center lines of the $\phi_{A1}$ electrodes irrespective of the ratio $L_{A1}$:$L_{A2}$:$L_{A3}$. That is, the spacing of pixel edges in interleaved adjacent lines is uniform across the field, so field interlacing is perfect.

Time $t_4$ is the end of a full-frame cycle of image integration and is the time $t_0$ of the beginning of the next cycle similar to that just described. As noted previously, the clocking of CCD imager 10 as just described is similar to that described by C. H. Sequin in U.S. Pat. No. 3,801,884. The freedom from field-rate flicker is attributable to length of the $\phi_{A1}$ gate electrodes being made equal to the combined lengths of the $\phi_{A2}$ and $\phi_{A3}$ gate electrodes in CCD imager 10.

FIG. 4 shows an imager structure similar to that of imager 10, but simplified to reduce the number of rows and columns in its A and B registers from around 256 and 500, respectively, to two (with three electrodes per row) and nine, respectively. The channel stop structure 20 shown in dashed outline defines the nine columns of the A and B registers, each of which is a charge coupled device comprising a first shift-register configuration in its A-register portion 30, followed by a second shift-register configuration in its B-register portion 40. Each of these columns 21-29 has the gate electrode structures 31, 32, 33, 34, 35 and 36 crossing it in A register 30. For purposes of clear illustration, the gate electrodes do not overlap in FIG. 4; in actual practice the structure is preferably constructed with overlapping electrodes as will be shown in FIG. 5.

In accordance with the present invention, gate electrode structures 31 and 34 to which $\phi_{A1}$ clock phase is applied are of a length twice that of gate electrode structures 32 and 35 to which $\phi_{A2}$ clock phase is applied and of gate electrode structures 33 and 36 to which $\phi_{A3}$ clock phase is applied.

In practice, the channel stops separating columns 21-29 in A register 30 may be wider than those in B register 40, in order to accomodate anti-blooming drain structures; this is omitted in FIG. 4 for clarity. B register 40 is shown arranged for three-phase clocking, by way of example, and has six gate electrodes 41, 42, 43, 44, 45, and 46 of like width disposed perpendicularly to columns 21-29 to define the rows in the register. Gate electrodes 41 and 44 receive a first clocking phase $\phi_{B1}$; gate electrodes 42 and 45 receive a second clocking phase $\phi_{B2}$; and gate electrodes 43 and 46 receive a third clocking phase $\phi_{B3}$. A C-register 50 is used for parallel-to-series data conversion and is shown by way of example as having three-phase clocking. During line retrace, C register clocking is halted with the $\phi_{C1}$ clock phase applied to the gate electrodes at the ends of columns being high for inducing depletion regions into which the charge samples descriptive of a line of pixels are clocked from B register output. The intervening $\phi_{C2}$ and $\phi_{C3}$ gate electrodes are low.

Three-phase clocking of the C register resumes during line trace to move charge samples a pixel at a time to a floating diffusion 51 connected to the gate electrode of a metal-oxide-semiconductor field-effect transister 52 in the video output amplifier of the imager. Diffusion 51 is periodically set to predetermined potential value, responsive to a reset pulse applied to a reset gate electrode 53 clamping diffusion 51 to a drain diffusion 54 by field-effect transister action. An additional, dc-biased gate electrode 55 may precede gate electrode 53 as a buffer to keep the reset pulse from the gate electrode of FET 52. The output circuitry for the C register is disclosed by way of example, other types of output circuitry also being known in the art.

Making the A-register gate electrodes in a CCD imager wider than about ten microns tend to cause a scintillating noise to become visible in the television pictures produced from the imager video output signal. This can be simply avoided by making the A-register gate electrodes $\phi_{A1}$ clock phase ten microns or slightly less in width and by making the A-register gate electrodes receiving $\phi_{A2}$ and $\phi_{A3}$ clock phases half so wide when practicing the present invention. These widths are sufficiently large that they can be realized by conventional photolithographic processes in making the CCD imager.

FIG. 5 shows a cross-section of a group of A register gates having effective widths proportioned in accordance with the invention. The cross-section is taken through the imager die, between channel stops, perpendicular to the direction of charge transfer under the gates. Construction can be essentially as described by C. H. Sequin, F. J. Morris, T. A. Shankoff, M. F. Tompsett and E. J. Zimany, Jr., in their paper "Charge-Coupled Area Image Sensor Using Three Levels of Polysilicon" appearing in *IEEE TRANSACTIONS ON ELECTRON DEVICES,* Vol. ED-21, No. 11, November 1974, pp. 712-720. Further description of the construction of triple polysilicon CCD's is provided by W. J. Bertram, A. M. Mohsen, F. J. Morris, D. A. Sealer, C. H. Sequin, and M. F. Thompsett in their paper "A Three-Level Metallization Three-Phase CCD" appearing in the subsequent No. 12 of Vol. ED-21, December 1974, pp. 758-767. A p-type silicon substrate 60 in a buried-channel CCD imager is doped at its front surface (towards top of FIG. 5) to be n-type, forming a junction 61 defining the surface of the buried channel along which charge packets are transfered. (The initial processing of silicon substrate 60 also includes diffusion of source and drain features and implantation of channel stops; these features are not shown in FIG. 5).

A silicon dioxide (SiO$_2$) layer about 1500 Å thick, portions 62 of which remain under long $\phi_{A1}$ electrodes 63 is thermally grown on the front surface of substrate 60. The first level of polysilicon is deposited on this first gate oxide layer, doped with phosphorus to make it conductive and to facilitate contacting, and steam oxidized. The resulting SiO$_2$ layer, about 1000 Å thick, provides the etch mask in the subsequent photo-etching to define a first set of gate electrodes structures 63. Making the long $\phi_{A1}$ electrodes first is preferred since the ratio of their length to the sum of the lengths of the shorter $\phi_{A2}$ and $\phi_{A3}$ electrodes is established without having to rely on the perfections of alignment of two successive photomasking steps. Too, the capacitance of the long electrode to its surrounding is minimized by placing it in the first level of polysilicon rather than in the second or third.

A fresh layer of gate oxide, portions 64 of which remain over $\phi_{A1}$ gates and under $\phi_{A2}$ gates, is thermally grown. The second level of polysilicon is deposited over this second gate oxide, doped with phosphorus, and steam oxidized. The oxide layer is photo-etched to define a second set of gate electrode structures 65 in the underlying second level of doped polysilicon. Then a fresh layer of gate oxide, portions 66 of which remain over $\phi_{A2}$ gates and under $\phi_{A3}$ gates, is thermally grown. The third level of polysilicon is deposited, doped with phosphorus, and steam oxidized. The oxide and the underlying third level of doped polysilicon are photo-etched to define a third set of gate electrode structures 67. A cap oxide is thermally grown.

The substrate 60 is thinned to ten microns or so by etching away its original bottom surface. The new bottom surface has a graded diffusion put into it to suppress surface recombination of charge carriers. The thinned substrate is laminated to a glass backing plate (not shown). Then, in portions of the CCD imager not shown in FIG. 5, contact windows to the polysilicon levels and to the substrate are opened, and top metalization is deposited and etched to form what is in effect a fourth level of metal.

What is claimed is:

1. A camera system for generating video signals with field interlacing responsive to received radiant energy images, with substantially reduced alternate-field flicker, said camera system comprising:
   a CCD imager of field transfer type having an image register with first, second and third sets of gate electrodes cyclically disposed in parallel perpendicular to its charge transfer channels, a first storage register and at least one parallel-to-series-data-converting read-out register followed by a charge-sample-to-video-signal conversion stage;
   means for focussing said radiant energy images on the image register of said CCD imager;
   a processing amplifier for receiving video signal from each charge-sample-to-video-signal conversion stage; and
   means for supplying clocking signals to said processing amplifier and to said CCD imager register, including
   means for supplying first and second and third phases of a three-phase clocking signals, respectively, to the first and second and third sets of electrodes in the image register of said CCD imager during field transfer times, said field transfer times being between adjoining image integration times consecutively numbered with respect to an arbitrarily chosen reference image integration time,
   means for halting said three-phase clocking during each odd-numbered image integration time so that charge integration occurs only near the first set of gate electrodes, and
   means for halting said three-phase clocking during each even-numbered image integration time so that charge integration occurs only under the second and the third sets of gate electrodes; and
   the improvement wherein the length of each gate electrode in said first set of image register gate electrodes is substantially equal to the sum of the lengths of the gate electrodes in said second and third sets.

2. A camera system as set forth in claim 1 wherein the lengths of the gate electrodes in said second and third sets are of subtantially the same value.

3. A CCD imager of the field transfer type with an image register comprising:
   a substrate of semiconductive material with at least a first plane surface near which repose a plurality of parallelled charge transfer channels;
   an insulating layer having opposing sides, the first of which adjoins the first plane surface of said substrate; and
   a plurality of gate electrode structures on the second side of said insulating layer, parallelly arranged in consecutive order according to an ordinal numbering in such orientation as to cross the direction of charge transfer in said charge transfer channels, those gate electrode structures numbered with a first one of modulo three values having similar lengths as measured in the direction of charge transfer and those numbered with second and third ones of modulo three value each having lengths as measured in the direction of charge transfer half as large as the gate electrode structures numbered with said first modulo three value;
   means interconnecting the gate electrode structures numbered with the first modulo three value for receiving a first phase of clocking signal;
   means interconnecting the gate electrode structures numbered with the second modulo three value for receiving a second phase of clocking signal; and
   means interconnecting the gate electrode structures numbered with the third modulo three value for receiving a third phase of clocking signal.

4. A CCD imager as set forth in claim 3 constructed by three-level polysilicon process or its like and characterized by the first formed gate electrode structures being those longer ones numbered with the first one of modulo three values.

5. A CCD imager as set forth in claim 3 having in combination therewith:
   means for supplying three-phase clocking signals in said first, second and third phases during field transfer intervals interposed between adjacent consecutively numbered image integration intervals;
   means for halting three-phase clocking during odd-numbered image integration intervals so charge is integrated in said substrate only in the immediate vicinities of those gate electrode structures numbered with the first modulo three value and
   means for halting three-phase clocking during even-numbered image integration intervals so charge is integrated in said substrate only in the immediate vicinities of those gate electrode structures numbered with the second and third modulo three values.

6. In a three-phase operated CCD imager of the field transfer type having A, B, and C registers, the A register including channels extending in the column direction and gate electrodes extending in the row direction, and wherein there are three gate electrodes per stage, each receptive of a different phase of a three-phase voltage during the propagation of charge from the A to the B register, the improvement comprising:

in each set of three electrodes a particular one of the electrodes having a given length in the charge transfer direction, and the remaining two electrodes having respective lengths which sum to that given length; and means for applying an integration voltage to said one electrode of each set and a voltage for creating a potential barrier to the remaining two electrodes of each set during each field of one group of alternate field times, and for applying an integrating voltage to said two reamining electrodes and a voltage for creating a potential barrier to said one electrode during each field of the other group of alternate field times.

7. An improvement as set forth in claim 6 wherein the remaining two electrodes in each set have lengths that are equal.

8. In a CCD imager constructed by three-level polysilicon process or its like and in accordance with claim 6, the electrodes of said given length being constructed in the first level.

* * * * *